United States Patent
Waki et al.

(10) Patent No.: US 9,731,968 B2
(45) Date of Patent: Aug. 15, 2017

(54) PROCESS FOR PRODUCING FLUORIDE GAS

(75) Inventors: Masahide Waki, Izumiotsu (JP);
Tatsuhiro Yabune, Izumiotsu (JP);
Kazuhiro Miyamoto, Izumiotsu (JP);
Kazutaka Hirano, Izumiotsu (JP)

(73) Assignee: STELLA CHEMIFA CORPORATION, Osaka-Shi (JP)

( * ) Notice: Subject to any disclaimer, the term of this patent is extended or adjusted under 35 U.S.C. 154(b) by 588 days.

(21) Appl. No.: 13/057,587

(22) PCT Filed: Jun. 8, 2009

(86) PCT No.: PCT/JP2009/060417
§ 371 (c)(1),
(2), (4) Date: Feb. 4, 2011

(87) PCT Pub. No.: WO2010/016326
PCT Pub. Date: Feb. 11, 2010

(65) Prior Publication Data
US 2011/0135555 A1    Jun. 9, 2011

(30) Foreign Application Priority Data

Aug. 8, 2008 (JP) .................. 2008-205991

(51) Int. Cl.
*C01B 35/06* (2006.01)
*C01B 33/107* (2006.01)
(Continued)

(52) U.S. Cl.
CPC .......... *C01B 9/08* (2013.01); *C01B 33/10705* (2013.01); *C01B 35/061* (2013.01);
(Continued)

(58) Field of Classification Search
CPC ... C01B 9/08; C01B 35/061; C01B 33/10705; C01B 25/10; C01B 35/063; C01G 17/04; C01G 28/007
(Continued)

(56) References Cited

U.S. PATENT DOCUMENTS 2,488,298 A * 11/1949 Lange et al. .................. 423/301
3,584,999 A *  6/1971 Wiesboeck ................... 423/301
(Continued)

FOREIGN PATENT DOCUMENTS

DE        812247 A  *  3/1941
EP        0846657 A1    6/1998
(Continued)

OTHER PUBLICATIONS

Kirk-Othmer Encyclopedia of Chemical Technology, Dec. 2000, "Fluorine compouns, Inorganic, Phosphorus", pp. 1-11, taken from http://onlinelibrary.wiley.com/doi/10.1002/0471238961.1608151912091404.a01/pdf.*
(Continued)

*Primary Examiner* — Ngoc-Yen Nguyen
(74) *Attorney, Agent, or Firm* — Knobbe Martens Olson & Bear LLP

(57) ABSTRACT

Disclosed is a process for producing a fluoride gas that can produces fluoride gases such as $BF_3$, $SiF_4$, $GeF_4$, $PF_5$ or $AsF_5$ at a reduced production cost in a simple manner. The process is characterized in that a compound containing an atom, which, together with a fluorine atom, can form a polyatomic ion, is added to a hydrogen fluoride solution to produce the polyatomic ion in a hydrogen fluoride solution and to evolve a fluoride gas comprising the fluorine atom and the atom that, together with the fluorine atom, can form a polyatomic ion.

5 Claims, 3 Drawing Sheets

(51) Int. Cl.
*C01G 17/04* (2006.01)
*C01B 25/10* (2006.01)
*C01G 28/00* (2006.01)
*C01B 9/08* (2006.01)

(52) U.S. Cl.
CPC ............ *C01B 35/063* (2013.01); *C01G 17/04* (2013.01); *C01G 28/007* (2013.01)

(58) Field of Classification Search
USPC ........................................ 423/301, 300, 489
See application file for complete search history.

(56) References Cited

U.S. PATENT DOCUMENTS

| | | | |
|---|---|---|---|
| 3,674,431 | A | 7/1972 | Driscoll et al. |
| 3,875,292 | A * | 4/1975 | Wiesboeck et al. .......... 423/472 |
| 5,242,670 | A | 9/1993 | Gehringer |
| 5,487,876 | A * | 1/1996 | Mallinson et al. ........... 422/205 |
| 5,935,541 | A * | 8/1999 | Bonnet ................ C01D 15/005 423/301 |
| 6,322,764 | B1 * | 11/2001 | Smith et al. .................. 423/301 |
| 6,514,474 | B1 | 2/2003 | Kikuyama et al. |
| 6,540,969 | B1 * | 4/2003 | Smith et al. .................. 423/301 |
| 6,645,451 | B1 | 11/2003 | Schulz et al. |
| 2002/0127174 | A1 | 9/2002 | Smith et al. |
| 2003/0143145 | A1 * | 7/2003 | Kikuyama ............ C01D 15/005 423/301 |
| 2007/0003466 | A1 * | 1/2007 | Oka ................ 423/342 |
| 2010/0322838 | A1 * | 12/2010 | Waki ...................... C01B 25/10 423/301 |

FOREIGN PATENT DOCUMENTS

| | | |
|---|---|---|
| EP | 1947057 A1 | 7/2008 |
| EP | 2 189 418 A1 | 5/2010 |
| GB | 1322843 | 7/1973 |
| JP | S53-023791 B | 7/1978 |
| JP | 04-175216 | 6/1992 |
| JP | 04265213 A * | 9/1992 |
| JP | 10-053406 A | 2/1998 |
| JP | H10-245211 A | 9/1998 |
| JP | 3258413 B2 | 12/2001 |
| JP | 4005174 B2 | 8/2007 |
| JP | WO 2008096724 A1 * | 8/2008 ............ C01B 25/10 |
| JP | 2009-062259 A | 3/2009 |
| KR | 1020010040353 A | 5/2001 |
| WO | WO 03/040034 A1 | 5/2003 |
| WO | 2009/022676 A1 | 2/2009 |

OTHER PUBLICATIONS

Arslan, Zikri et al., Determination of trace elements in siliceous samples by ICP-MS after precipitation of silicon flourosilicate, Microchimica Acta, Jul. 2007, pp. 219-225, vol. 160, No. 1-2, The Netherlands.

Meshri, Dayal et al, Commercial scale preparation, properties and the performance of LiAsF6, LiPF6, LiBF4 electrolytes in secondary lithium ion and lithium cells, $17^{th}$ Annual Battery Conference on Applications and Advances, Piscataway, NJ, USA, Jan. 15, 2002, pp. 151-163.

Extended Search Report dated Sep. 20, 2012 in corresponding European Application No. 09804813.5.

Office Action issued Aug. 31, 2012 in corresponding Chinese Application No. 200980128444.0.

Yamaguchi et al., "Determination of trace silicon in high-purity copper by molybdosilicate spectrophotometric method after generation as silicon fluoride." Bunseki Kagaku, 51(8):653-656 (2002).

Mizuno et al., "Determination of boron in steel by inductively coupled plasma mass spectrometry after closed-vessel microwave dissolution and anion exchange separation." Current Advances in Materials and Processes, 14(6):1365 (2001).

Office Action issued Apr. 28, 2014 for corresponding Taiwan Patent Application No. 10320572750.

Office Action issued Apr. 27, 2016 in corresponding KR Application No. 10-2011-7005508.

* cited by examiner

PROCESS FOR PRODUCING FLUORIDE GAS

This application is the U.S. National Phase under 35. U.S.C. §371 of International Application PCT/JP2009/060417, filed Jun. 8, 2009, which claims priority to Japanese Patent Application No. 2008-205991, filed Aug. 8, 2008. The International Application was published under PCT Article 21(2) in a language other than English.

TECHNICAL FIELD

The present invention relates to a process for producing a fluoride gas, more specifically, a fluoride-gas-producing process which makes it possible to produce a fluoride gas simply at low costs, examples of the gas including trifluoroboron ($BF_3$), tetrafluorosilicon ($SiF_4$), tetrafluorogermanium ($GeF_4$), pentafluorophosphorus ($PF_5$), and pentafluoroarsenic ($AsF_5$), which are each a material useful, as a dopant for a silicon wafer or a raw material of various fluorine compounds, in the semiconductor industry, the chemical industry or the medical industry.

BACKGROUND ART

As a process for producing $BF_3$ gas, which is a fluoride gas species, known is, for example, a process of causing boron oxide and hydrofluoric acid to react with each other to synthesize an aqueous solution of boron fluoride, and adding at least one of sulfuric acid or fuming sulfuric acid to the aqueous solution, thereby causing a dehydrating effect of sulfuric acid or the like to generate $BF_3$ gas.

Moreover, a process for producing $SiF_4$ is a process (1) of decomposing a metal silicofluoride such as barium silicofluoride thermally, thereby yielding $SiF_4$, a process (2) of causing silicon oxide and fluorosulfuric acid to react with each other, thereby producing $SiF_4$, a process (3) of causing a mixture of silicon oxide and fluorite to react with sulfuric acid, thereby producing $SiF_4$, or some other process.

Furthermore, a process for producing $GeF_4$ may be a process (4) of decomposing a fluorogermanium metal compound, such as barium hexafluorogerumanate thermally, thereby yielding $GeF_4$, or a process (5) of adding, to tetrachlorogermanium, a fluorinating agent, such as zinc fluoride, or a mixture of trifluoroantimony and pentachloroantimony, thereby causing the two compounds to react with each other. Patent document 1 also discloses a process (6) of causing metallic germanium, and fluorine gas or trifluoronitrogen to react with each other, thereby yielding $GeF_4$.

As a process for producing $PF_5$ or $AsF_5$, known are a process (7) of decomposing a fluorophosphorus metal compound, such as lithium hexafluorophosphate, or a fluoroarsenic metal compound, such as lithium hexafluoroarsenate, thermally, and a process (8) of causing a phosphorus pentahalide, or an arsenic pentahalide to react with hydrogen fluoride. Moreover, Patent document 2 discloses a production process (9) of causing a phosphorus trihalide or arsenic trihalide to react with a halogen gas, such as chlorine, bromine or iodine, and hydrogen fluoride.

According to the $BF_3$-producing process, a sulfuric acid waste fluid which contains boron is generated in a large amount; thus, facilities or costs are required in order to process the waste fluid. Additionally, sulfur components such as $SO_3$ are incorporated, as impurities, into the resultant, $BF_3$.

In the $SiF_4$-producing processes (1) and (3), it is necessary to make the temperature of the reaction system high, so that costs required for the heating increase. In the processes (2) and (3), a hydrofluoric-acid-containing sulfuric acid waste fluid and gypsum are generated, respectively, as a byproduct. Costs for processing the byproduct are required.

The $GeF_4$-producing process (4) has a problem that costs required for the heating are high. The process (5) has a problem that a chlorine compound or an antimony compound is incorporated into the resultant, $GeF_4$, so that high-purity $GeF_4$ is not easily obtained, and the process (6) has a problem that $GeF_4$, which is obtained by the reaction, and metallic germanium, which is one of the raw materials, react with each other to generate solid germanium difluoride ($GeF_2$) as a byproduct so that the apparatus or pipe is clogged therewith, whereby a continuous operation thereof may become unable.

The $PF_5$- or $AsF_5$-producing process (7) has a problem that energy consumed for the thermal decomposition is very large. In the process (8), halogenated hydrogen gas, which is a byproduct, is incorporated into the resultant, $PF_5$ or $AsF_5$; and in the process (9), the halogen gas, which is one of the raw materials, as well as halogenated hydrogen, which is a byproduct, is incorporated into $PF_5$ or $AsF_5$. Thus, the processes each have a problem that high-purity $PF_5$ or $AsF_5$ is not easily obtained.

PRIOR ART DOCUMENTS

Patent Documents

Patent document 1: Japanese Patent No. 3258413
Patent document 2: Japanese Patent No. 4005174

DISCLOSURE OF THE INVENTION

Problems to be Solved by the Invention

In light of the above-mentioned problems, an object of the invention is to provide a fluoride-gas-producing process which makes it possible to produce a fluoride gas, such as $BF_3$, $SiF_4$, $GeF_4$, $PF_5$ or $AsF_5$, simply at decreased producing costs.

Means for Solving the Problems

In order to solve the problems in the prior art, the inventors have made investigations on a process for producing a fluoride gas. As a result, the inventors have found out that the object can be attained by adopting a process described below, so as to make the invention.

Thus, in order to solve the problems, in the process for producing a fluoride gas according to the invention, a compound which contains an atom that can be combined with a fluorine atom to form a polyatomic ion is added to a hydrogen fluoride solution, so as to produce the polyatomic ion in the hydrogen fluoride solution, thereby generating the fluoride gas that comprises the fluorine atom and the atom, which can be combined with the fluorine atom to form the polyatomic ion.

According to the process, a compound which contains an atom that can be combined with a fluorine atom to form a polyatomic ion is added to a hydrogen fluoride solution, thereby producing the polyatomic ion first in the hydrogen fluoride solution. When this polyatomic ion is generated in the hydrogen fluoride solution, it becomes possible to generate a fluoride gas comprising a fluorine atom, and the atom, which that can be combined with the fluorine atom to form the polyatomic ion, details of which are unclear.

It is preferable that a carrier gas is brought into contact with the hydrogen fluoride solution, in which the polyatomic ion is dissolved, thereby extracting the fluoride gas into the carrier gas.

It is preferable that hydrogen fluoride gas is used as the carrier gas.

It is possible that wherein hydrogen fluoride is evaporated from the hydrogen fluoride solution, in which the polyatomic ion is dissolved, thereby generating the fluoride gas.

It is preferable that the polyatomic ion is at least one selected from the group consisting of a $BF_4^-$ ion, a $SiF_6^{2-}$ ion, a $GeF_6^{2-}$ ion, a $PF_6^-$ ion, and an $AsF_6^-$ ion.

Advantageous Effects

According to the invention, a compound which contains an atom that can be combined with a fluorine atom to form a polyatomic ion is added to a hydrogen fluoride solution, whereby a fluoride gas can easily be produced. In other words, for example, without needing to make the high temperature of the hydrogen fluoride solution, the fluoride gas can be generated near normal temperature; thus, costs for the production can be reduced. Moreover, the generation of unnecessary byproducts can also be restrained; thus, it becomes possible to avoid the addition of the step of removing any byproduct or to decrease the production costs related thereto.

BEST MODE FOR CARRYING OUT THE INVENTION

Figure 1:
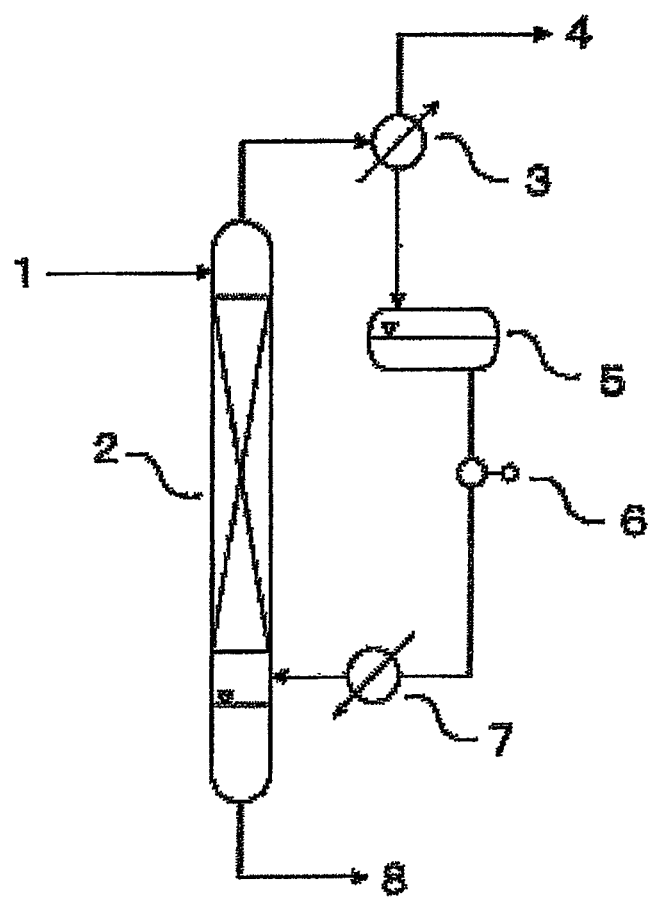
FIG. 1 The figure is a schematic view which schematically illustrates an apparatus for producing a fluoride gas according to an embodiment of the invention.

In the process of the invention for producing a fluoride gas, a compound which contains an atom that can be combined with a fluorine atom to form a polyatomic ion is added to a hydrogen fluoride solution, thereby producing the polyatomic ion first in the hydrogen fluoride solution. When the compound is added to the hydrogen fluoride solution, the state of the compound may be any one of a solid state, a liquid state and a gas state.

The hydrogen fluoride solution may be a solution wherein anhydrous hydrogen fluoride is dissolved in water, an organic solvent, or a mixed solvent of water and an organic solvent. More specifically, for example, a commercially available hydrofluoric acid in an industrial grade, a regular grade, a semiconductor grade or some other grade may be used as it is, or the hydrofluoric acid may be used in the state that the concentration thereof is appropriately adjusted. From the viewpoint of the restraint of amount of impurities, it is preferred to use, out of these grades, the semiconductor grade. From the viewpoint of production costs, it is preferred to use the industrial grade or regular grade.

When a gaseous byproduct is generated by the reaction between the above-mentioned compound and hydrogen fluoride, it is preferred to conduct a pretreatment of causing the compound to react with hydrogen fluoride beforehand in a separate step, thereby generating the byproduct, and then removing this byproduct. Thereafter, the compound after the treatment is added to a hydrogen fluoride solution. This manner makes it possible to prevent the incorporation of the byproduct into the fluoride gas to make the purity of the produced fluoride gas high. However, the pretreatment may not be necessarily conducted when the gaseous byproduct is an easily-removable byproduct, or when a purification step of purifying the fluoride gas is provided after the step of generating the fluoride gas.

A material that causes the generation of the gaseous byproduct by the reaction between the above-mentioned compound and hydrogen fluoride can be, for example, a halide other than any fluoride, such as pentachloroarsenic. The byproduct can be, for example, a hydrogen halide other than hydrogen fluoride, such as hydrogen chloride. The method for removing the byproduct is not particularly limited, and, for example, the following method may be adopted: a method wherein to hydrogen fluoride to be used for the reaction is beforehand added water necessary for a matter that arsenate hexafluoride ($HAsF_6$), which is generated by reaction between pentachloroarsenic and hydrogen fluoride, can turn into such a hydrous form that this arsenate can be relatively stably present in hydrofluoric acid, i.e., $HAsF_6 \cdot xH_2O$, and then hydrogen chloride, which is secondarily produced, is separated, in the form of a gas, from hydrofluoric acid wherein $HAsF_6 \cdot xH_2O$ is dissolved.

The above-mentioned compound, which contains an atom that can be combined with a fluorine atom to form a polyatomic ion, is not particularly limited, and can be, for example, an inorganic or organic fluoride complex salt, or a compound that can react with hydrogen fluoride so as to be combined with a fluorine atom, thereby forming a complex ion. More specifically, the compound can be, for example, an oxide, hydroxide, carbonate, nitrate, sulfate or halide of boron, silicon, germanium, phosphorus, arsenic or some other element.

Examples of the polyatomic ion include $BF_4^-$, $SiF_6^{2-}$, $GeF_6^{2-}$, $PF_6^-$ and $AsF_6^-$.

In the invention, only by adding the compound, which contains an atom that can be combined with a fluorine atom to form a polyatomic ion, to a hydrogen fluoride solution, a fluoride gas can be produced. For this reason, thermal decomposition and other treatments conducted when, for example, a metal fluoride complex salt is used can be omitted in the invention. In other words, in the fluoride-gas-producing process of the invention, a large quantity of energy is not required to be introduced from the outside of the reaction system, so that a fluoride gas can be produced at low costs. The temperature when the above-mentioned compound is added to the hydrogen fluoride solution is preferably a temperature higher than the melting point of the polyatomic-ion-containing hydrogen fluoride solution, and lower than the boiling point thereof. Examples of the above-mentioned metal fluoride complex salt include metal silicofluorides, such as barium silicofluoride, and fluorogermanium metal compounds, such as barium hexafluorogerumanate.

The pressure when the compound is added to the hydrogen fluoride solution is not particularly limited. The operation therefore can easily be made near the atmospheric pressure. In a reduced-pressure system, vacuum facilities are required; thus, the production costs unfavorably increase. When the pressure is high, a pressure-resistant apparatus is required; thus, the production costs unfavorably increase.

The method for adding the compound to the hydrogen fluoride solution is not particularly limited. It is therefore allowable to add the compound to the hydrogen fluoride solution, or charge the compound (into the reaction system) and then add the hydrogen fluoride solution thereto. It is also allowable to add the two simultaneously.

In the invention, it is also allowable to bring a carrier gas into contact with the hydrogen fluoride solution wherein the polyatomic ion is dissolved, thereby extracting the fluoride gas into the carrier gas.

The carrier gas is not particularly limited as far as the carrier gas is inert to the hydrogen fluoride solution and the fluoride gas. Specific examples thereof include HF gas, $N_2$ gas, He gas, Ar gas, dry air, and carbon dioxide gas. Of these gases, HF gas is preferred in the invention. Into HF gas may be incorporated one or more of the other gases described above.

The water content by proportion in the carrier gas is preferably 1% or less by weight, more preferably 100 ppm or less by weight, in particular preferably 10 ppm or less by weight. If the water content by proportion is more than 1% by weight, the water content by proportion in the extracted fluoride gas also increases.

The method for bringing the carrier gas into contact with the hydrogen fluoride solution, wherein the polyatomic ion is dissolved, is not particularly limited. An ordinarily used tank-type or tower-type gas-liquid contacting apparatus is preferably used. The contact is attained, for example, by bubbling the hydrogen fluoride solution, wherein the polyatomic ion is dissolved, with the carrier gas.

The temperature when the carrier gas is brought into contact with the hydrogen fluoride solution is preferably from −50 to 50° C., more preferably from −10 to 50° C., in particular preferably from 0 to 30° C. If the temperature is lower than −50° C., the vapor pressure of the fluoride gas lowers so that the efficiency of the extraction unfavorably deteriorates. By contrast, if the temperature is higher than 50° C., water vapor is generated together on the generated gas side, which is dependent on the water concentration in the hydrogen fluoride solution. Thus, the fluoride gas is inconveniently hydrolyzed.

The pressure when the carrier gas is brought into contact with the solution is preferably from 1 kPa to 5 MPa, more preferably from 10 kPa to 1 MPa, in particular preferably from 0.05 to 0.5 MPa. If the pressure is less than 1 kPa, heavy vacuum facilities are required so that costs therefor inconveniently become overmuch. By contrast, if the pressure is more than 5 MPa, the high-pressure apparatus inconveniently becomes enormous.

Moreover, by heating the hydrogen fluoride solution, wherein the polyatomic ion is dissolved, a fluoride gas can be extracted into generated HF gas. In this case, the heating temperature needs to be not lower than the boiling point of the hydrogen fluoride solution, wherein the polyatomic ion is dissolved.

Figure 2:
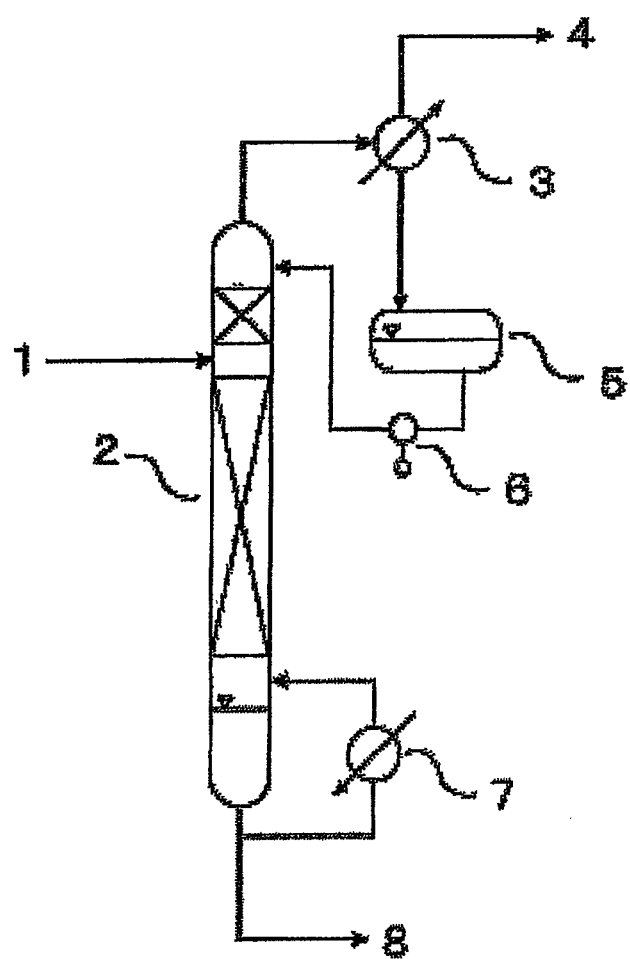
FIG. 2 The figure is a schematic view which schematically illustrates an apparatus for producing a fluoride gas according to another embodiment of the invention.
Figure 3:
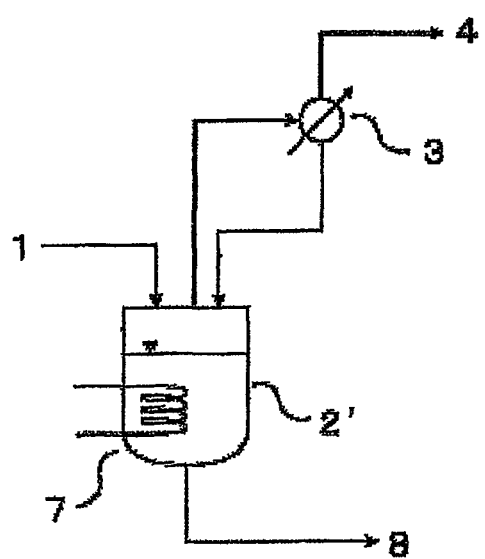
FIG. 3 The figure is a schematic view which schematically illustrates an apparatus for producing a fluoride gas according to still another embodiment of the invention.

The following will describe producing apparatuses used for the fluoride-gas-production of the invention on the basis of FIGS. 1 to 3. FIG. 1 is a schematic view illustrating a fluoride-gas-producing apparatus in a case where hydrogen fluoride is used as the carrier gas so as to be circulated.

A hydrogen fluoride solution in a tank 5 is sent to a heating device 7 by effect of a pump 6. The hydrogen fluoride solution is vaporized in the heating device 7. Thereafter, a carrier gas is supplied to a bottom region of a diffusion tower 2. Separately, a compound which contains an atom that can be combined with a fluorine atom to form a polyatomic ion is added to a hydrogen fluoride solution, thereby producing, in advance, a raw material 1 made of the polyatomic-ion-dissolved hydrogen fluoride solution, and then this raw material 1 is supplied to a tower top region of the diffusion tower 2. In this way, the polyatomic-ion-dissolved raw material 1 dropping from the tower top region of the diffusion tower 2 and hydrogen fluoride gas as the carrier gas are brought into contact with each other in a countercurrent manner. As a result of this countercurrent contact, a fluoride gas can be extracted into the carrier gas. Furthermore, the hydrogen fluoride solution after the countercurrent contact is discharged as a tower-discharge liquid 8 from the bottom region of the diffusion tower 2, and further hydrogen fluoride gas containing the fluoride gas is taken out form the tower top of the diffusion tower 2 and then supplied to a condenser 3 into which a refrigerant is passed. In this way, the most portion of hydrogen fluoride gas is condensed to be separated from the fluoride gas 4. The condensed portion of hydrogen fluoride is sent to the tank 5, and then used to be circulated.

The operating pressure in the diffusion tower 2 is not particularly limited. The operation near the atmospheric pressure is easy. The operating temperature of the diffusion tower 2 is preferably not higher than the boiling point of the hydrogen fluoride solution, wherein the polyatomic ion is dissolved, under the operating pressure for the solution. When hydrogen fluoride gas is used as the carrier gas, the tower 2 can be operated at the boiling point of hydrogen fluoride, or higher.

In a case where the concentration of hydrogen fluoride is high in the solution obtained by adding the above-mentioned compound to the hydrogen fluoride solution, a fluoride gas may be generated by use of, for example, a producing apparatus illustrated in FIG. 2 or 3 when the solution is boiled by heating or the like so as to generate vapor of hydrogen fluoride.

When the producing apparatus illustrated in FIG. 2 is used, a raw material 1 made of a hydrogen fluoride solution wherein a polyatomic ion is dissolved is first produced in advance. This raw material 1 is supplied to a distillation tower 2. The raw material 1 is heated by a heating device 7 located in a bottom region of the distillation tower 2, so that hydrogen fluoride is partially vaporized. In this way, the polyatomic-ion-dissolved raw material 1 dropping in the distillation tower 2 and hydrogen fluoride gas as the carrier gas are brought into contact with each other in a countercurrent manner. As a result of this countercurrent contact, a fluoride gas can be extracted into the carrier gas. Furthermore, the hydrogen fluoride solution after the countercurrent contact is discharged as a tower-discharge liquid 8 from the bottom region of the diffusion tower 2, and further hydrogen fluoride gas containing the fluoride gas is taken out form the tower top of the distillation tower 2 and then supplied to a condenser 3 into which a refrigerant is passed. In this way, the most portion of hydrogen fluoride gas is condensed to be separated from the fluoride gas 4. The condensed portion of hydrogen fluoride is sent to the tank 5, and then used to be circulated. By sending the hydrogen fluoride solution in the tank 5 to a tower top region of the distillation tower 2 by a pump 6, the concentration of hydrogen fluoride in the tower-discharge liquid 8 is kept constant so that the fluoride gas can be stably generated.

When a producing apparatus illustrated in FIG. 3 is used, to a reaction tank 2' filled with a hydrogen fluoride solution is added a raw material 1 made of a compound which contains an atom that can be combined with a fluorine atom to form a polyatomic ion, or made of a solution wherein a compound which contains an atom that can be combined with a fluorine atom to form a polyatomic ion is dissolved. In this way, the polyatomic ion is generated in the hydrogen fluoride solution. Subsequently, this hydrogen fluoride solution is heated by a heating device 7 located in the reaction tank 2'. In this way, a fluoride-gas-containing hydrogen fluoride gas is generated.

This hydrogen fluoride gas is supplied to a condenser 3 into which a refrigerant is passed. In this way, the most portion of the hydrogen fluoride gas is condensed to be separated from the fluoride gas 4. The condensed portion of the hydrogen fluoride is sent to the reaction tank 2', and then used to be circulated. After the fluoride gas is generated, the hydrogen fluoride solution is discharged as a tank-discharge liquid 8 from a bottom region of the reaction tank 2'.

In a case where the compound, which forms a polyatomic ion, is a solid in a hydrogen fluoride solution or in the case of a slurry-form raw material suspended in a hydrogen fluoride solution, the use of, for example, a tower such as the diffusion tower or distillation tower 2 causes stoppage therein to make it difficult to operate the apparatus continuously. It is therefore preferred to use a producing apparatus as illustrated in FIG. 3 to generate a fluoride gas.

The tower used to generate a fluoride gas may be the diffusion tower or distillation tower 2. The diffusion tower or distillation tower 2 may be a packed tower or a tray tower. The reaction tank 2' used to generate a fluoride gas may be a tank equipped with a stirring device or heating device.

The generation of a fluoride gas may be performed in any one of a batch manner, a semi-batch manner, and a continuous manner. Considering the efficiency thereof and a stable operation, it is preferred to attain the generation in a continuous manner.

EXAMPLES

Hereinafter, preferred examples of this invention will be illustratively described in detail. However, materials, blend amounts and so on that will be described in the examples are not intended to limit the scope of this invention into only the described materials and so on as far as no restrictive description thereabout is included. Thus, the materials and so on are mere descriptive examples.

Example 1

At a temperature of 15° C. and the atmospheric pressure, 42 parts by weight of potassium silicofluoride ($K_2SiF_6$) were added, in a batch manner, to a vessel wherein 286 parts by weight of anhydrous hydrofluoric acid was put. On dissolving potassium silicofluoride in anhydrous hydrofluoric acid, the generation of a gas was observed. The generated gas was introduced into a condenser to condense the most portion of hydrofluoride acid, thereby separating the portion from a non-condensable gas. This non-condensable gas was qualitatively analyzed with a Fourier transform infrared spectrophotometer (referred to as an "FT-IR" hereinafter). As a result, it was verified that $SiF_4$ gas as a fluoride gas was generated.

Example 2

To a vessel wherein 83.32 parts by weight of 40% by weight hydrofluoric acid was put were added 16.68 parts by weight of silicon dioxide in a batch manner. In this way, a hydrosilicofluoric acid solution ($H_2SiF_6$ aq.) having a concentration of 40% by weight was prepared. Furthermore, the hydrosilicofluoric acid solution was charged into a vessel, and the solution was bubbled with nitrogen. The nitrogen-containing gas components were introduced into a condenser to separate a condensed component and a non-condensable component from each other. The non-condensable gas was qualitatively analyzed with an FT-IR. As a result, it was verified that $SiF_4$ gas as a fluoride gas was generated. Furthermore, 19 parts by weight of hydrosilicofluoric acid bubbled with nitrogen were added to 263 parts by weight of anhydrous hydrofluoric acid. The generated gas components were introduced into a condenser to separate a condensed component and a non-condensable component from each other. The non-condensable gas was qualitatively analyzed with the FT-IR. As a result, it was verified that $SiF_4$ gas as a fluoride gas was generated.

Example 3

In the present example, the producing apparatus illustrated in FIG. 1 was used to produce a fluoride gas. Specifically, trifluoroboron hydrate ($BF_3 1.5H_2O$) in a liquid state was first supplied thereto from the tower top region of the diffusion tower 2. Vapor of hydrofluoric acid was supplied thereto from the bottom region of the diffusion tower 2 to conduct stripping. The vapor taken out from the top region of the diffusion tower was introduced into the condenser to condense the most portion of hydrofluoric acid, thereby separating the portion from a non-condensable gas. This non-condensable gas was qualitatively analyzed with an FT-IR. As a result, it was verified that $BF_3$ gas as a fluoride gas was generated.

Example 4

In the present example, the producing apparatus illustrated in FIG. 2 was used to produce a fluoride gas. Specifically, a solution wherein 45.1 parts by weight of lithium borofluoride ($LiBF_4$) were dissolved in 290 parts by weight of anhydrous hydrofluoric acid was first supplied into the distillation tower. Vapor taken out from the top region of the distillation tower was introduced into the condenser to condense the most portion of hydrofluoric acid, thereby separating the portion from a non-condensable gas. This non-condensable gas was qualitatively analyzed with an FT-IR. As a result, it was verified that $BF_3$ gas as a fluoride gas was generated.

Example 5

In the present example, the producing apparatus illustrated in FIG. 3 was used to produce a fluoride gas. Specifically, 47 parts by weight of potassium borofluoride ($KBF_4$) were first added to 276 parts by weight of anhydrous hydrofluoric acid in the reaction tank 2' to be suspended therein. In this way, a slurry was prepared. The slurry was heated and boiled to evaporate hydrofluoric acid partially. Vapor taken out from the tank was introduced into the condenser to condense the most portion of hydrofluoric acid, thereby separating the portion from a non-condensable gas. This non-condensable gas was qualitatively analyzed with an FT-IR. As a result, it was verified that $BF_3$ gas as a fluoride gas was generated.

Example 6

In the present example, the producing apparatus illustrated in FIG. 3 was used to produce a fluoride gas. Specifically, 12 parts by weight of barium silicofluoride ($BaSiF_6$) were first suspended into 266 parts by weight of anhydrous hydrofluoric acid in the reaction tank 2', and then the resultant was heated to evaporate hydrofluoric acid partially. In this way, vapor was taken out from the tank. The vapor taken out from the tank was introduced into the condenser to condense the most portion of hydrofluoric acid, thereby separating the portion from a non-condensable gas. The non-condensable gas was qualitatively analyzed with an FT-IR. As a result, it was verified that $SiF_4$ gas as a fluoride gas was generated.

Example 7

In the present example, the producing apparatus illustrated in FIG. 1 was used to produce a fluoride gas. Specifically, germanate hexafluoride synthesized by causing 12 parts by weight of germanium oxide ($GeO_2$) and 244 parts by weight of anhydrous hydrofluoric acid to react with each other was first supplied to the top region of the diffusion tower 2. Subsequently, vapor of hydrofluoric acid was supplied thereto from the bottom region of the diffusion tower 2 to conduct stripping. Gas taken out from the top region of the diffusion tower 2 was introduced into the condenser 3 to condense the most portion of hydrofluoric acid, thereby separating the portion from a non-condensable gas. This non-condensable gas was qualitatively analyzed with an FT-IR. As a result, it was verified that $GeF_4$ gas as a fluoride gas was generated.

Example 8

In the present example, the producing apparatus illustrated in FIG. 1 was used to produce a fluoride gas. Specifically, a solution of phosphate hexafluoride ($HPF_6$) in hydrogen fluoride, $HPF_6$ being synthesized by causing 17 parts by weight of diphosphorus pentaoxide ($P_2O_5$) and 285 parts by weight of anhydrous hydrofluoric acid to react with each other, was first supplied to the top region of the diffusion tower 2. Vapor of hydrofluoric acid was supplied thereto from the bottom region of the diffusion tower 2 to conduct stripping. Subsequently, gas taken out from the top region of the diffusion tower 2 was introduced into the condenser 3 to condense the most portion of hydrofluoric acid, thereby separating the portion from a non-condensable gas. This non-condensable gas was qualitatively analyzed with an FT-IR. As a result, it was verified that $PF_5$ gas as a fluoride gas was generated.

Example 9

In the present example, the producing apparatus illustrated in FIG. 1 was used to produce a fluoride gas. Specifically, a solution of phosphate hexafluoride ($HPF_6$) in hydrogen fluoride, $HPF_6$ being synthesized by causing 20 parts by weight of 75% by weight phosphoric acid ($H_3PO_4$ aq.) and 366 parts by weight of anhydrous hydrofluoric acid to react with each other, was first supplied to the top region of the diffusion tower 2. Vapor of hydrofluoric acid was supplied thereto from the bottom region of the diffusion tower 2 to conduct stripping. Subsequently, gas taken out from the top region of the diffusion tower 2 was introduced into the condenser 3 to condense the most portion of hydrofluoric acid, thereby separating the portion from a non-condensable gas. This non-condensable gas was qualitatively analyzed with an FT-IR. As a result, it was verified that $PF_5$ gas as a fluoride gas was generated.

Example 10

In the present example, the producing apparatus illustrated in FIG. 1 was used to produce a fluoride gas. Specifically, a solution of arsenate hexafluoride ($HAsF_6$) in hydrogen fluoride, $HAsF_6$ being synthesized by causing 24 parts by weight of arsenic pentaoxide ($As_2O_6$) and 211 parts by weight of anhydrous hydrofluoric acid to react with each other, was first supplied to the top region of the diffusion tower 2. Vapor of hydrofluoric acid was supplied thereto from the bottom region of the diffusion tower 2 to conduct stripping. Subsequently, gas taken out from the top region of the diffusion tower 2 was introduced into the condenser 3 to condense the most portion of hydrofluoric acid, thereby separating the portion from a non-condensable gas. This non-condensable gas was qualitatively analyzed with an FT-IR. As a result, it was verified that $AsF_5$ gas as a fluoride gas was generated.

REFERENCE NUMERALS

1 raw material
2 diffusion tower or distillation tower
2' reaction tank
3 condenser
4 fluoride gas
5 tank
6 pump
7 heating device
8 tower-discharge liquid

The invention claimed is:

1. A process for producing a fluoride gas, comprising:
   adding a compound, which contains an atom that is combined with a fluorine atom or an atom that can be combined with a fluorine atom to form a polyatomic ion, to a hydrogen fluoride solution, so as to produce the polyatomic ion in the hydrogen fluoride solution, and
   generating the fluoride gas that comprises the fluorine atom and the atom, which can be combined with the fluorine atom to form the polyatomic ion, wherein the compound contains an organic fluoride complex salt.

2. The process for producing a fluoride gas according to claim 1, wherein a carrier gas is brought into contact with the hydrogen fluoride solution, in which the polyatomic ion is dissolved, thereby extracting the fluoride gas into the carrier gas.

3. The process for producing a fluoride gas according to claim 2, wherein hydrogen fluoride gas is used as the carrier gas.

4. The process for producing a fluoride gas according to claim 1, wherein hydrogen fluoride is evaporated from the hydrogen fluoride solution, in which the polyatomic ion is dissolved, thereby generating the fluoride gas.

5. The process for producing a fluoride gas according to claim 1, wherein the polyatomic ion is at least one selected from the group consisting of a $BF_4^-$ ion, a $SiF_6^{2-}$ ion, a $GeF_6^{2-}$ ion, a $PF_6^-$ ion, and an $AsF_6^-$ ion.

* * * * *